(12) United States Patent
Cocchi et al.

(10) Patent No.: US 10,945,447 B2
(45) Date of Patent: Mar. 16, 2021

(54) MACHINE FOR MAKING LIQUID OR SEMI-LIQUID FOOD PRODUCTS AND PRODUCTION SYSTEM COMPRISING THE MACHINE

(71) Applicant: ALI GROUP S.r.l.—CARPIGIANI, Cernusco sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco sul Naviglio (IT)

( * ) Notice: Subject to any disclaimer, the term of this patent is extended or adjusted under 35 U.S.C. 154(b) by 83 days.

(21) Appl. No.: 16/294,465

(22) Filed: Mar. 6, 2019

(65) Prior Publication Data
US 2019/0281857 A1    Sep. 19, 2019

(30) Foreign Application Priority Data
Mar. 13, 2018    (IT) .................. 102018000003504

(51) Int. Cl.
*A23G 9/16* (2006.01)
*A23G 9/22* (2006.01)
(Continued)

(52) U.S. Cl.
CPC ............ *A23G 9/16* (2013.01); *A23G 9/04* (2013.01); *A23G 9/08* (2013.01); *A23G 9/224* (2013.01);
(Continued)

(58) Field of Classification Search
CPC .......... A23G 9/16; A23G 9/281; A23G 9/228; A23G 9/04; A23G 9/08; A23G 9/224;
(Continued)

(56) References Cited

U.S. PATENT DOCUMENTS

2012/0312049 A1    12/2012 Downs et al.
2013/0087050 A1*   4/2013 Studor .................... A47J 31/52
                                                                99/285
(Continued)

FOREIGN PATENT DOCUMENTS

| CN | 107040545 A | 8/2017 |
| EP | 2805620 A1 * | 11/2014 |
| EP | 2805620 B1 * | 11/2014 |

OTHER PUBLICATIONS

Italian Search Report dated Oct. 22, 2018 for counterpart Italian Patent Application No. IT 102018000003504.

*Primary Examiner* — Emmanuel E Duke
(74) *Attorney, Agent, or Firm* — Shuttleworth & Ingersoll, PLC; Timothy Klima

(57) ABSTRACT

A machine for making liquid or semi-liquid food products, including: a first processing container for processing a liquid or semi-liquid base product and defining a processing chamber; a stirrer mounted inside the first processing container; a thermal system including a heat exchanger, associated with the first processing container; a processing and control unit, including a module for receiving and transmitting data, a processing module and a memory containing processing software instructions which can be carried out by the processing module, the processing and control unit defining a storage node of a distributed architecture database.

18 Claims, 6 Drawing Sheets

(51) Int. Cl.
*A23G 9/28* (2006.01)
*A23G 9/52* (2006.01)
*G05B 15/02* (2006.01)
*G06Q 10/08* (2012.01)
*A23G 9/04* (2006.01)
*A23G 9/08* (2006.01)
*G06Q 50/28* (2012.01)

(52) U.S. Cl.
CPC ............. *A23G 9/228* (2013.01); *A23G 9/281* (2013.01); *A23G 9/288* (2013.01); *A23G 9/52* (2013.01); *G05B 15/02* (2013.01); *G06Q 10/08* (2013.01); *G06Q 50/28* (2013.01)

(58) Field of Classification Search
CPC . A23G 9/288; A23G 9/52; A23G 9/28; A23G 9/305; A23G 3/02; G06Q 10/08; G06Q 50/28; G06Q 50/12; G06Q 30/06; G06Q 10/06; G06Q 10/087; G06Q 50/00; G05B 15/02; A23C 9/1223; G07F 13/00; G01N 33/146; H04L 12/12; A47J 31/52; B67D 1/0888

See application file for complete search history.

(56) References Cited

U.S. PATENT DOCUMENTS

| | | | |
|---|---|---|---|
| 2014/0295044 A1* | 10/2014 | Cocchi | A23G 9/22 426/520 |
| 2015/0315008 A1* | 11/2015 | Locke | B67D 1/0888 222/52 |
| 2016/0325980 A1* | 11/2016 | Sawhney | G06F 3/0482 |
| 2016/0358169 A1* | 12/2016 | Androulaki | G06F 16/951 |
| 2017/0186110 A1* | 6/2017 | Carpenter | G06Q 20/202 |
| 2019/0163896 A1* | 5/2019 | Balaraman | H04L 9/0637 |

* cited by examiner

_US 10,945,447 B2_

MACHINE FOR MAKING LIQUID OR SEMI-LIQUID FOOD PRODUCTS AND PRODUCTION SYSTEM COMPRISING THE MACHINE

This application claims priority to Italian Patent Application IT 102018000003504 filed Mar. 13, 2018, the entirety of which is incorporated by reference herein.

BACKGROUND OF THE INVENTION

This invention relates to a machine for making liquid or semi-liquid food products and to a production system comprising the machine for making liquid or semi-liquid food products.

A particularly strongly felt need in the sector of the production of liquid or semi-liquid food products is that for machines which are capable of particularly efficiently storing and exchanging information relating to machine operations and/or interaction between the machines and their users.

To date, machines are known in the sector in question which are capable of sending process or use data to a central processor which stores the data.

This system has several disadvantages, the most critical ones being linked to the risk of losing the data stored in the central server. Since the data, in practice, needs to be received and stored continuously, the risk of data loss can only partly be limited by periodic backups.

Another need is to guarantee the authenticity of the data received and stored, especially certain types of data.

SUMMARY OF THE INVENTION

This invention therefore has for an aim to meet the above mentioned needs by providing a machine for making a liquid or semi-liquid product and which is capable of guaranteeing that process information can be transmitted and stored efficiently and securely.

BRIEF DESCRIPTION OF THE DRAWINGS

The technical features of the invention, with reference to the above aims, are clearly described in the annexed claims and its advantages are more apparent from the detailed description which follows, with reference to the accompanying drawings which illustrate a preferred, non-limiting embodiment of the invention and in which:

DESCRIPTION OF THE PREFERRED EMBODIMENTS

Figure 1:
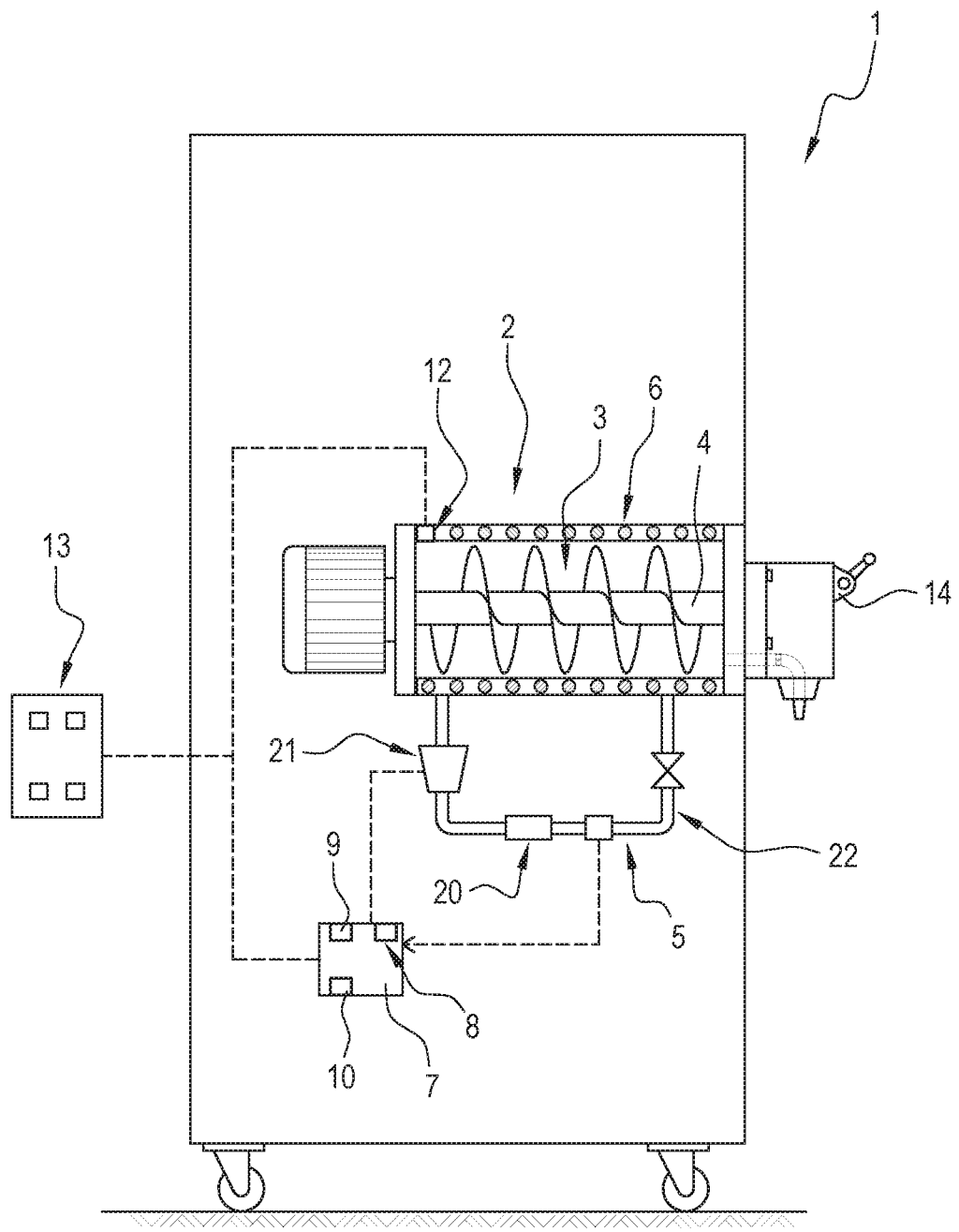
FIG. 1 is a schematic view of a first embodiment of a machine according to this invention.

With reference to the accompanying drawings, the numeral 1 denotes a machine forming the object of this invention, for making liquid or semi-liquid food products.

The machine is preferably designed to make products for the ice cream, bakery and confectionery and related trades (such as, by way of non-limiting example, gelato, soft ice cream, granitas, sorbets, milk shakes, yogurts, frozen desserts, chilled dessert creams).

The machine 1 for making liquid or semi-liquid products comprises:

a first processing container 2 for processing a liquid or semi-liquid base product and defining a processing chamber 3;

a stirrer 4 for mixing the product in the first processing container 2 (the stirrer 4 being preferably mounted inside the first container 2);

a processing and control unit 7, comprising a processing module 9 and a memory 10 containing processing software instructions which can be carried out by the processing module 9, the processing and control unit 7 defining an (electronic) storage node of a distributed architecture database DB.

The machine 1 preferably also comprises a thermal system 5 comprising a heat exchanger 6, associated with the first processing container 2.

The memory 10 may be a distributed HW memory or a memory concentrated in a single unit.

Preferably, the storage node may be a "mining node".

Preferably, the processing and control unit 7 comprises a module 8 for receiving and transmitting data.

The module 8 for receiving and transmitting data comprises a data communication interface.

Preferably, the module 8 for receiving and transmitting data is configured to be connected to an Internet network.

According to another aspect, the processing and control unit 7 defines a storage node of a distributed (decentralized) architecture, database DB of the distributed ledger type.

As illustrated in the accompanying drawings, the machine 1 comprises a motor connected to the stirrer 4 for driving it in rotation.

Preferably, the motor is connected to the processing and control unit 7.

According to another aspect, the thermal system 5 comprises a heat exchanger 6 associated with the first processing container 2 a further heat exchanger 20, a compressor 21 and a pressure reducing element 22.

It should be noted that the heat exchanger 6, the further heat exchanger 20, the compressor 21 and the pressure reducing element 22 define a circuit containing a heat exchanger fluid.

In other words, the thermal system 5 is a system of thermodynamic type (adapted to operate according to a thermodynamic cycle using a heat exchanger fluid).

The processing and control unit 7 may be a distributed unit, with distributed HW and SW elements, or it may be a single unit.

According to another aspect, the processing and control unit 7 defines a storage node of a distributed architecture database DB of the distributed blockchain type, comprising information grouped in a plurality of interconnected information blocks (B1, B2, . . . Bn).

According to yet another aspect, the processing and control unit 7 is configured to define a storage node of a distributed architecture database operating with a proof-of-work protocol.

According to another aspect, the processing and control unit 7 is configured to define a storage node of a distributed architecture database operating with a proof-of-stake protocol.

According to another aspect, the machine 1 comprises a sensor 12 adapted to capture a quantity or an operating parameter and connected to the processing and control unit 7, and the processing and control unit 7 is configured to generate a request to write the information captured by the sensor 12 to the distributed architecture database.

According to one aspect, the sensor 12 is a temperature sensor, adapted to measure the temperature of the ambient surroundings, or of the product inside the container 2, or of the heat exchanger fluid at a point in the thermal system 5.

According to another aspect, the sensor 12 is a level sensor, adapted to measure the level of product inside the container 2.

According to another aspect, the sensor 12 is a flow sensor, adapted to measure the flow of base mixture fed into the container 2.

According to another aspect, the sensor 12 is a flow sensor, adapted to measure the flow of product drawn out of the container 2. In this case, the flow sensor is preferably a sensor associated with the dispenser.

According to another aspect, the sensor 12 is a pressure sensor, adapted to measure the pressure of the product inside the container 2.

According to another aspect, the sensor 12 is a weight sensor (e.g., a load cell) adapted to measure the weight of the product inside the container 2, or the weight of a further container (e.g., 90 in FIG. 4) connected to the container 2.

According to another aspect, the sensor 12 is a pressure sensor, adapted to measure the pressure of the heat exchanger fluid at a point in the thermal system 5.

More generally speaking, according to another aspect, the sensor 12 is any sensor adapted to measure a quantity of base product which may be fed into the container 2 (from a container, a bag, or through any accessory), or drawn out of the container 2, or present inside the container 2.

According to another aspect, the machine 1 comprises a user interface 13 comprising at least one user-activable command (preferably a plurality of commands) and connected to the processing and control unit 7, and the processing and control unit 7 is configured to generate a request to write the information associated with the activation of that command to the distributed architecture database.

Preferably, the interface 13 comprises a display.

Preferably, the interface 13 comprises activable control switches and/or buttons selectable by a user.

According to yet another aspect, the machine 1 comprises a dispenser 14 which is connected to the first processing container 2 for processing a liquid or semi-liquid base product and which allows the product to be extracted from the container 2.

The dispenser 14 preferably comprises a lever which can be operated by the user to allow dispensing the liquid or semi-liquid base product.

According to another aspect, the processing and control unit 7 is configured to perform a hash algorithm.

According to another aspect, the processing and control unit 7 is configured to perform a hash algorithm of the SHA-256 type.

Preferably, the processing and control unit 7 (specifically, the memory 10) contains a copy (full or partial) of the database DB.

Preferably, the processing and control unit 7 (specifically, the memory 10) contains a copy (full or partial) of the database DB with information to be written to the database DB (specifically transactions).

It should be noted that, according to this latter aspect, the information (transactions) are validated—that is, written to the database DB—when the processing and control unit 7 is in operative connection (for example, through an Internet network or an intranet) with other storage nodes of the distributed architecture database DB.

It should also be noted, according to another aspect, that the processing and control unit 7 contains a buffer with the information (transactions) not yet written to the distributed architecture database DB.

Also defined according to the invention is a production system 100 for making liquid or semi-liquid products, comprising:

at least one machine 1 (preferably a plurality of machines 1) according to what is defined by the appended claims or by the foregoing description;

a distributed architecture database DB (of the type known as "distributed ledger"), at least one portion of the database DB being stored in the processing and control units 7 of the at least one machine 1 (or of the at least one portion of the machines 1 in the case of two or more machines 1).

According to one aspect, the system 1 is a private system: that is to say, the distributed architecture database DB is a database of private type.

Preferably, the storage nodes are interconnected through an Internet network and/or an intranet.

According to one aspect, the distributed architecture database DB is of the blockchain type and comprises information grouped in a plurality of interconnected information blocks (B1, B2, Bn).

The database DB comprises information associated with the presence of tokens associated with specific electronic addresses (wallets).

These tokens (or electronic currencies or crypto currencies) may be tokens created specifically for the system 100.

Preferably, the information blocks (B1, B2, Bn) are interconnected by cryptographic algorithms.

Preferably, each processing and control unit 7 has, associated with it, a private key of a cryptographic algorithm, this private key being also associated with a public key which is mathematically linked to the private key by a cryptographic algorithm (of the asymmetrical key type).

The set of private key and public key constitutes an asymmetric key cryptography algorithm.

Preferably, each processing and control unit 7 has, associated with it, an address registered in the distributed architecture database DB.

Preferably, the address registered in the distributed architecture database DB is mathematically linked to the public key, preferably derived by means of a cryptographic hash function.

Preferably, the public key is obtained from the private key through cryptographic algorithms, specifically ECDSA-512 algorithms and hash functions.

Preferably, the electronic (i.e. alphanumeric) address registered in the distributed architecture database DB is obtained from the public key (through cryptographic functions).

The private key is preferably used by each processing and control unit 7 when it is necessary to be authenticated in order to add new information to the database and to associate that information with a specific electronic address (in particular, in the case where the information consists of tokens associated with electronic addresses).

The private key and the public key are defined by a set of numeric or alphanumeric characters.

Preferably, according to another aspect, each block of the plurality of information blocks (B1, B2, Bn) has a time-marking associated with it.

Preferably, according to another aspect, each block of the plurality of information blocks (B1, B2, Bn) has a hash value (mathematically derived) associated with it (preferably as header).

Preferably, this hash value is generated by a cryptographic hash function executed on the contents associated with the block.

This offers guarantees of the unchangeability of the block linked substantially to the fact that it is possible to run the cryptographic algorithm to check whether the contents of the block generate that hash value (indeed, changing just one bit of the block contents would generate a different hash value). This hash value is obtained by applying a cryptographic (hash) function to the contents of the block.

Preferably, with the exception of the first block (block zero), the value of each block is added to the hash value of the block following it (the value of the block B1 is added to the block B2) before generating the hash value of the block itself using a cryptographic hash function).

That way, the information blocks are connected to each other by the cryptography, which allows the unchangeability of the blockchain to be guaranteed.

Preferably, according to another aspect, each block of the plurality of information blocks (B1, B2, Bn) has an identifier (a unique alphanumeric value) associated with it.

According to yet another aspect, the processing and control units 7 are configured to generate further tokens and to assign them to a selected electronic wallet (address) as a result of adding a new block to the distributed architecture database DB of the blockchain type.

According to another aspect, the selected electronic wallet (address) corresponds to an electronic wallet (address) associated with the machine 1 which was the first to verify and grant an enable to add the new block to the distributed architecture database DB.

According to another aspect, the distributed architecture database DB is built on an Ethereum, Ethereum Classic, or Iota, or Eos, or NEO, or Waves, or Qtum, or NEM or Multiversum or R3 Corda or Ripple or Stellar platform.

According to another aspect, the system comprises a plurality of processors 16 which are configured to keep a complete copy of the distributed architecture database DB and which are connected in a network with the processing and control units 7 of the machines 1.

In other words, the nodes 16 define "full nodes" of the distributed architecture, blockchain database, while the process and control units 7 define "lightweight nodes" of the distributed architecture, blockchain database.

Advantageously, that means the processing and control units 7 of the machines 1 can store and process only a portion of the distributed architecture database; therefore, the processing and control unit 7 can be simpler and be provided with a lower capacity memory 10.

According to another aspect, in the system, the processing and control units 7 of the plurality of machines 1 are connected to each other through the Internet.

According to another aspect, the processing and control units 7 of the plurality of machines 1 communicate using the JSON-RPC protocol.

FIG. 1 shows a machine for making food products, preferably ice cream (soft ice cream or artisan gelato).

Figure 2:
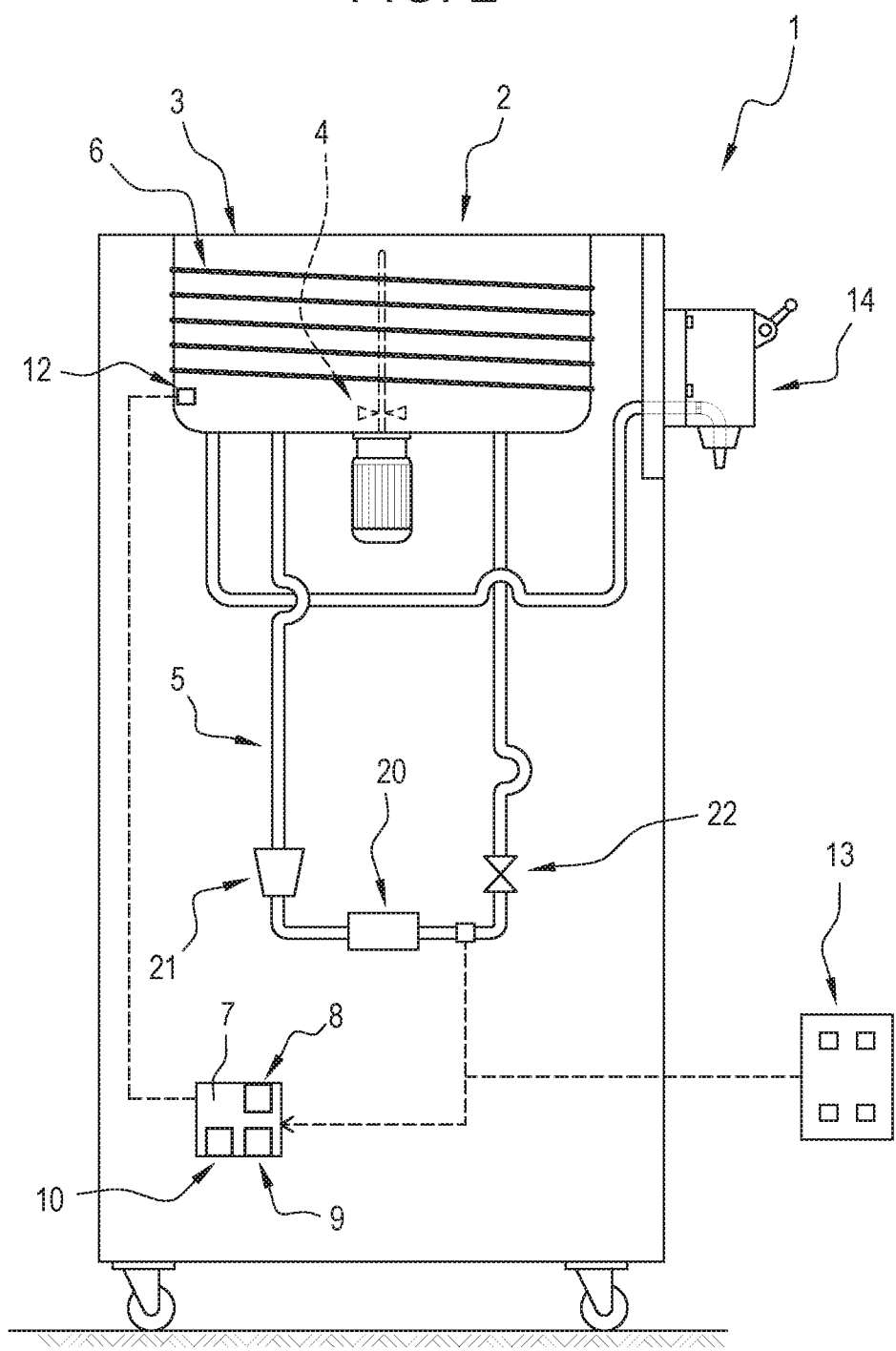
FIG. 2 is a schematic view of a second embodiment of a machine according to this invention.

FIG. 2 shows a machine adapted to (thermally) process liquid or semi-liquid products, specifically to pasteurize the products.

Figure 3:
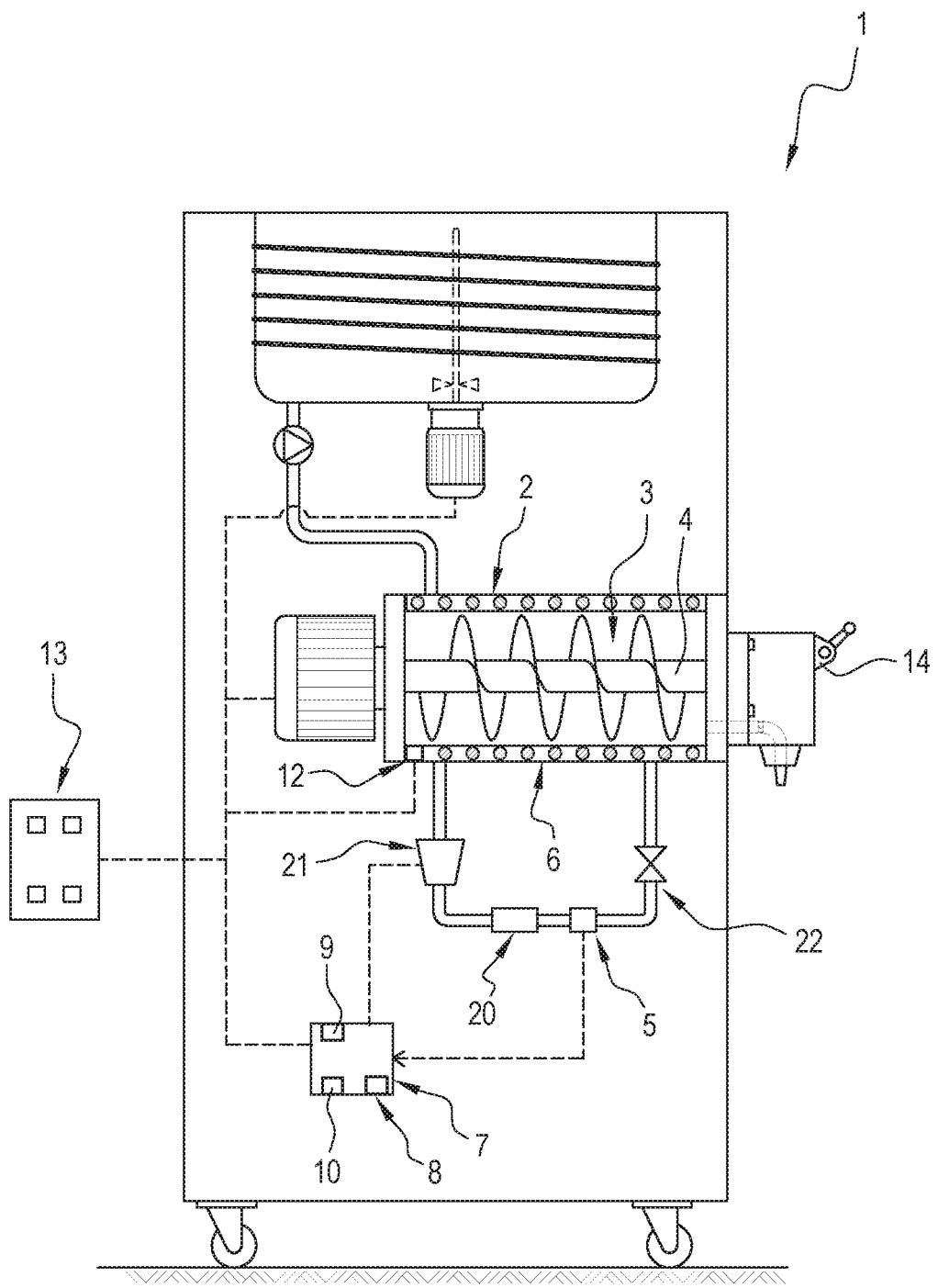
FIG. 3 is a schematic view of a third embodiment of a machine according to this invention.

FIG. 3 shows a machine for making ice cream (soft ice cream or artisan gelato) which is equipped with a thermal processing (pasteurizing) tank at the top of it.

Figure 4:
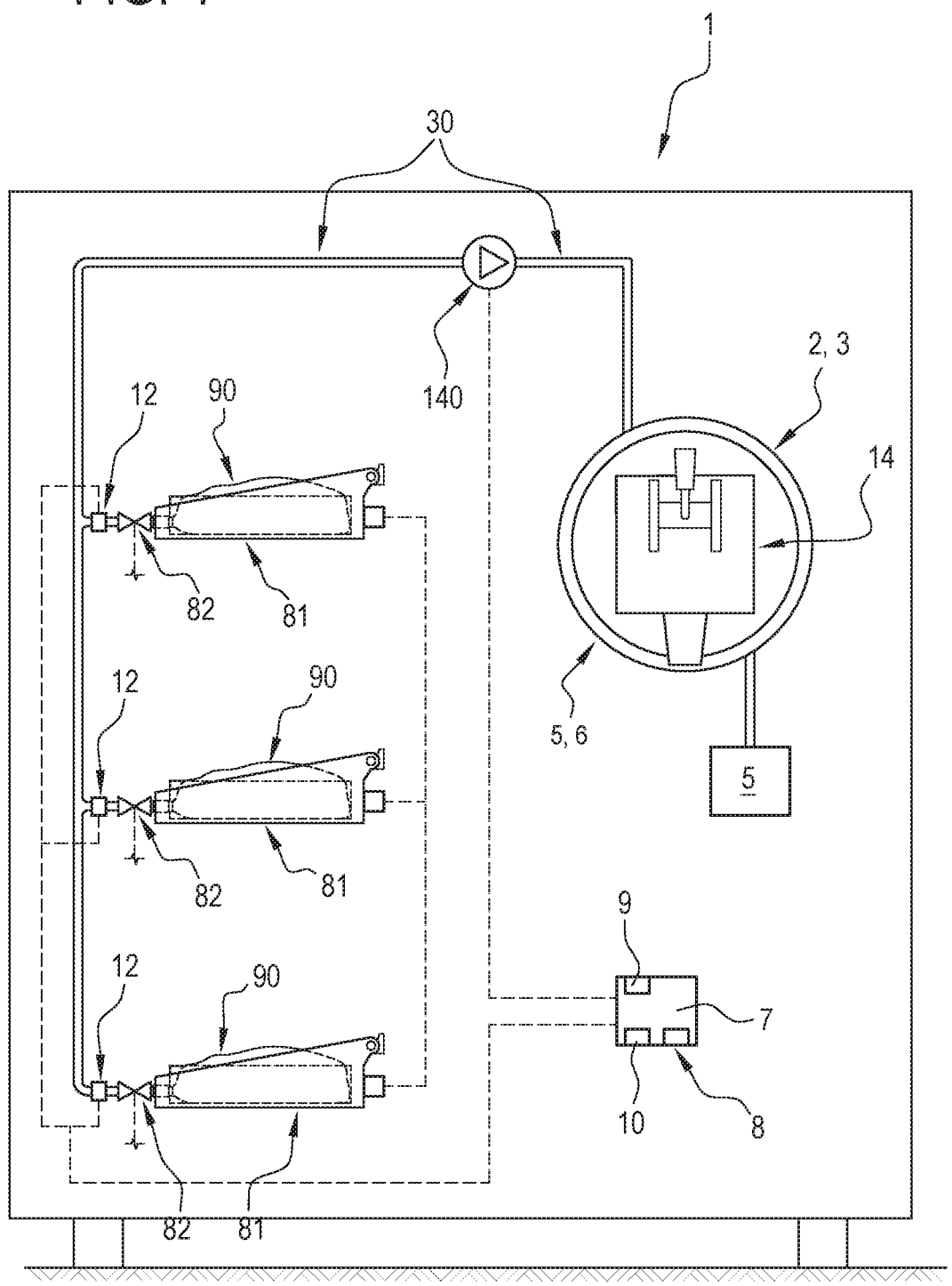
FIG. 4 is a schematic view of a fourth embodiment of a machine according to this invention.

With reference in particular to FIG. 4, it should be noted that the machine in this illustration comprises at least one further container 90 for feeding the base product to the container 2.

The further container 90 is connected to the first container 2 by a duct 30.

Preferably, the at least one further container 90 is a flexible container—that is to say, it is deformable (a bag).

Preferably, according to one aspect, a pump 140 is provided to allow the base product to be transferred between the further container 90 and the first container 2.

The pump 140 is preferably connected to the control unit 7.

According to further embodiments, the further container 90 is a package of the bag-in-box type.

Preferably, the further container 90 is supported by a supporting element 81.

In the embodiment of FIG. 4, the machine 1 preferably comprises a plurality of containers 90 connectable alternatively to each other and selectively to the first container 2.

In particular, it should be noted that each container 90 has, associated with it, a valve 82 adapted to be switched between a closed configuration and an open configuration. In the open configuration, the valve allows the base product to be drawn out of the container 90 it is associated with.

In this embodiment, too, processing of the product is performed inside the container 2.

Preferably, the sensor 12, in this embodiment, is a sensor for measuring the flow rate of base product (which is fed into the first container 2 or drawn out of the further container 90 or is flowing through the duct 30).

Alternatively, according to another aspect, the sensor 12 is a weight sensor, adapted to measure the weight of the base product inside the container 90. The weight sensor is preferably associated with the support 81.

Figure 5:
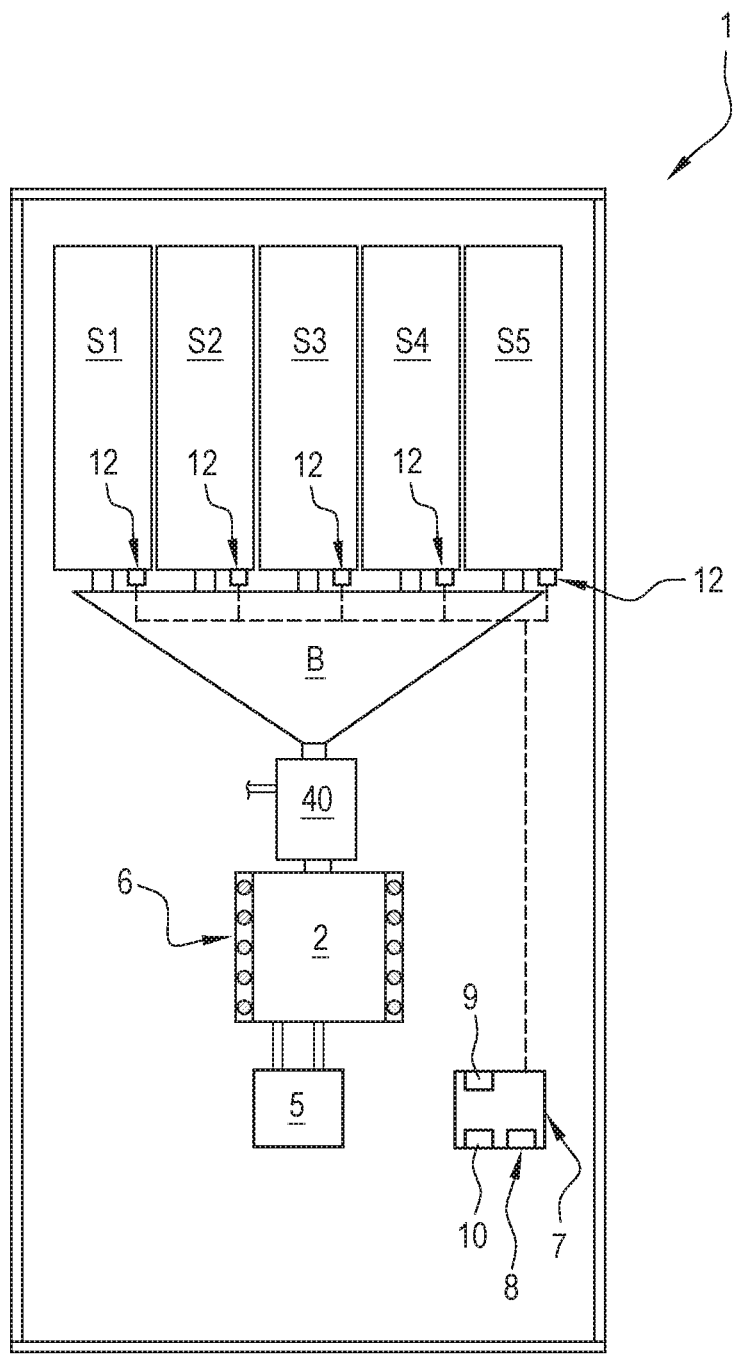
FIG. 5 is a schematic view of a fifth embodiment of a machine according to this invention.
Figure 6:
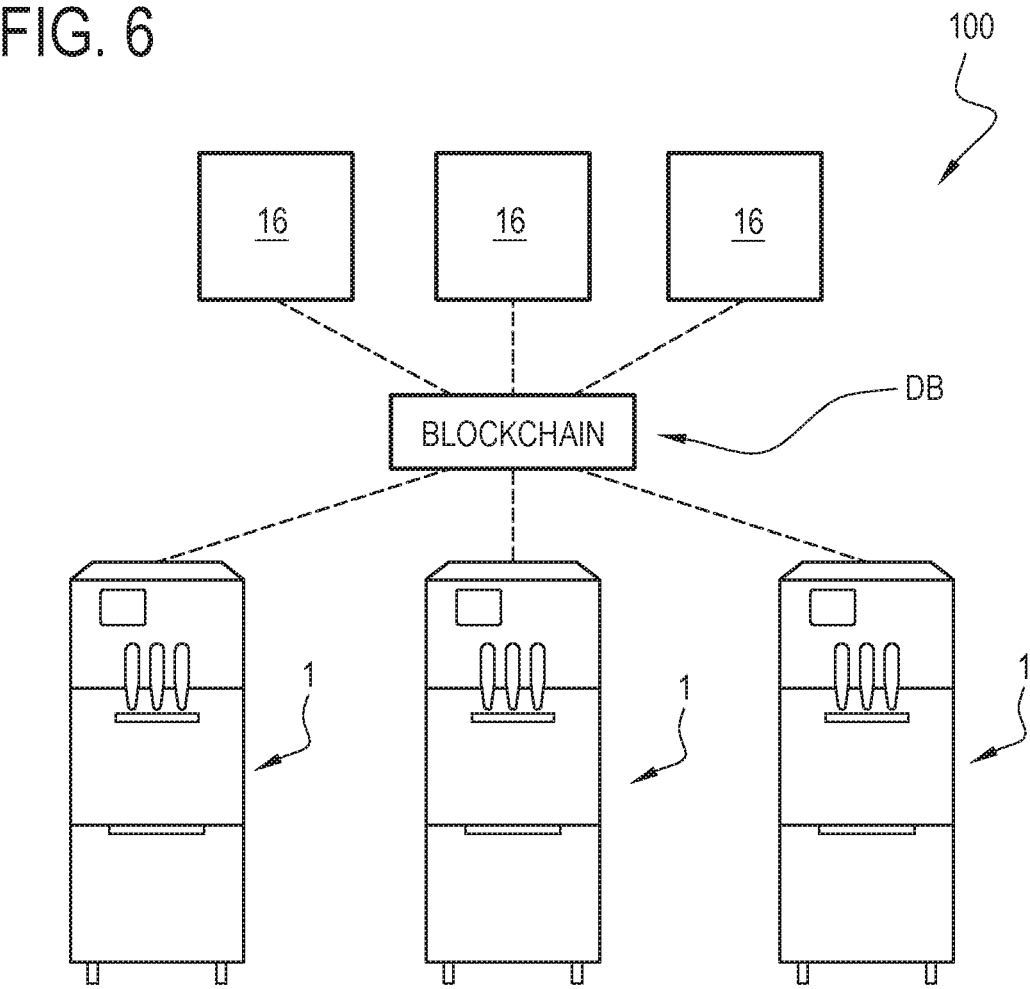
FIG. 6 is a schematic view of a machine system according to this invention.
Figure 7:
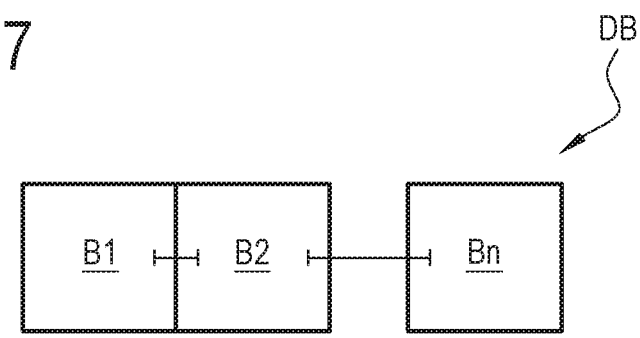
FIG. 7 is a schematic view of a distributed architecture database of blockchain type.

With reference in particular to FIG. 5, it should be noted that the machine 1 comprises a plurality of feeding containers (S1, S2, S3, S4, S5) for feeding base products to the processing container 2. Preferably, the base products are powder products.

It should be noted that the machine 1 preferably comprises a collector B connected to the processing container 2 and interposed between the feeding containers (S1, S2, S3, S4, S5) and the processing container 2.

Optionally, the machine 1 may comprise a mixing chamber 40, interposed between the first container 2 and the feeding containers (S1, S2, S3, S4, S5). Preferably, in the mixing chamber, a dilution liquid is added to the powder drawn out of the feeding container (S1, S2, S3, S4, S5).

What is claimed is:

1. A machine for making liquid or semi-liquid food products, comprising:
   a first processing container for processing a liquid or semi-liquid base product and defining a processing chamber;
   a stirrer for mixing the base product in the first processing container;
   a processing and control unit, comprising a processing module and a memory containing processing software instructions for instructing the processing module, the processing and control unit defining a storage node of a distributed architecture database;
   wherein the distributed architecture database is a distributed ledger distributed architecture database;
   wherein the processing and control unit defines a storage node of the distributed ledger distributed architecture database.

2. The machine according to claim 1, comprising a thermal system including a heat exchanger, associated with the first processing container.

3. The machine according to claim 1, wherein the distributed ledger distributed architecture database is a distributed blockchain distributed architecture database and the processing and control unit defines a storage node of the distributed blockchain distributed architecture database and the distributed blockchain distributed architecture database comprises information grouped in a plurality of interconnected information blocks.

4. The machine according to claim 3, and further comprising ECDSA-512 cryptographic algorithms interconnecting the information blocks.

5. The machine according to claim 1, wherein the processing and control unit is configured to define a node of the distributed architecture database operating with a proof-of-work protocol.

6. The machine according to claim 1, wherein the processing and control unit is configured to define a node of the distributed architecture database operating with a proof-of-stake protocol.

7. The machine according to claim 1, and further comprising a sensor adapted to capture a quantity or an operating parameter and connected to the processing and control unit, and wherein the processing and control unit is configured to generate a request to write information captured by the sensor to the distributed architecture database.

8. The machine according to claim 1, and further comprising a user interface including at least one user-activable command and connected to the processing and control unit, and wherein the processing and control unit is configured to generate a request to write information associated with activation of the command to the distributed architecture database.

9. The machine according to claim 1, and further comprising a dispenser which is connected to the first processing container for processing the base product and which allows the base product to be extracted from the dispenser.

10. A production system for making liquid or semi-liquid food products, comprising:
   at least one of the machine according to claim 1;
   wherein the distributed architecture database is stored in storage nodes, at least one portion of the distributed architecture database being stored in the processing and control unit of the at least one of the machine defining one of the storage nodes.

11. The production system according to claim 10, wherein the distributed ledger distributed architecture database is a distributed blockchain distributed architecture database and comprises information grouped in a plurality of interconnected information blocks.

12. The production system according to claim 11, wherein the distributed architecture database comprises information associated with a presence of tokens to specific electronic addresses.

13. The production system according to claim 12, wherein the at least one of the machine comprises a plurality of machines including a plurality of processing and control units, respectively, and the plurality of processing and control units are configured to generate further tokens and to assign the further tokens to a selected electronic address as a result of adding a new block to the distributed blockchain distributed architecture database.

14. The production system according to claim 13, wherein the selected electronic address corresponds to an electronic address associated with one of the plurality of machines that was a first to verify and grant an enable to add the new block to the distributed architecture database.

15. The production system according to claim 10, wherein the distributed architecture database is built on an Ethereum, Ethereum Classic, or Iota, or Eos, or NEO, or Waves, or Qtum, or NEM or Multiversum or R3 Corda or Ripple or Stellar platform.

16. The production system according to claim 10, comprising a plurality of processors which are configured to keep a complete copy of the distributed architecture database and which are connected in a network with the storage nodes.

17. The production system according to claim 10, wherein the processing and control units of the plurality of machines are connected to each other through the Internet.

18. The production system according to claim 10, wherein the distributed ledger distributed architecture database is a distributed blockchain distributed architecture database and comprises information grouped in a plurality of interconnected information blocks, each block of the plurality of blocks having a time-marking associated therewith.

* * * * *